United States Patent [19]

Fuller

[11] 4,150,570
[45] Apr. 24, 1979

[54] HUMIDITY SENSING DEVICE

[76] Inventor: David L. Fuller, 1110 Mountain Creek Trail NW., Atlanta, Ga. 30328

[21] Appl. No.: 814,898

[22] Filed: Jul. 12, 1977

Related U.S. Application Data

[63] Continuation-in-part of Ser. No. 646,038, Jan. 2, 1976, Pat. No. 4,034,609.

[51] Int. Cl.² .................................. G01W 1/02
[52] U.S. Cl. .................................. 73/335; 73/73
[58] Field of Search ............... 73/335, 73, 356, 358; 116/114.5

[56] References Cited

U.S. PATENT DOCUMENTS

| | | | |
|---|---|---|---|
| 2,787,238 | 4/1957 | Luce | 73/335 X |
| 3,861,213 | 1/1975 | Parker | 73/356 |
| 3,893,340 | 7/1975 | Parker | 73/356 |
| 3,898,354 | 8/1975 | Parker | 73/356 |
| 3,965,742 | 6/1976 | Parker | 73/356 |
| 4,070,912 | 1/1978 | McNaughtan | 73/356 |

*Primary Examiner*—Richard C. Queisser
*Assistant Examiner*—Joseph W. Roskos
*Attorney, Agent, or Firm*—B. J. Powell

[57] ABSTRACT

A multiple laminate humidity sensing device for visually indicating changes in relative humidity including a moisture impermeable transparent cover layer; an indicator layer including a transparent carrier material and an inorganic salt composition dispersed in the transparent carrier material that provides a known visible color response to changes in relative humidity to which the indicator layer is exposed; and a moisture permeable reflective layer behind the indicator layer so that light passing through the cover layer and the indicator layer is reflected back through the indicator layer and the cover layer so as to be readily visible from that side of the cover layer opposite the indicator layer.

13 Claims, 9 Drawing Figures

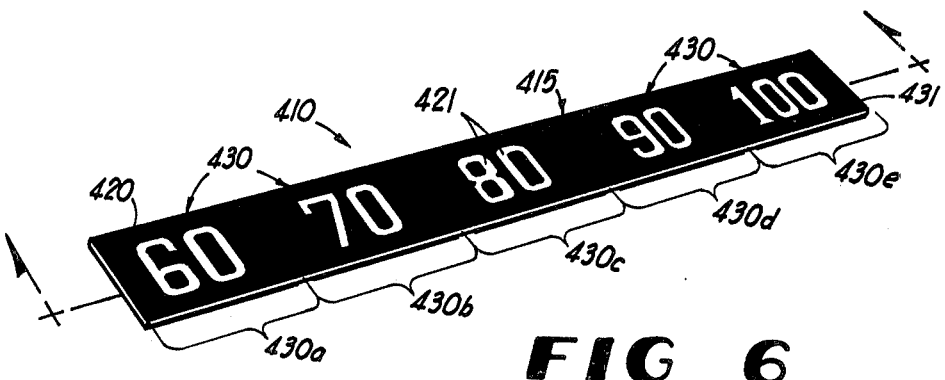
FIG 6
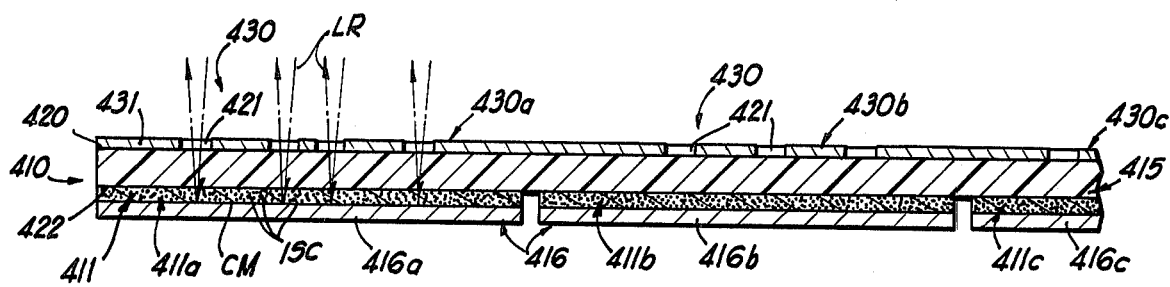
FIG 7
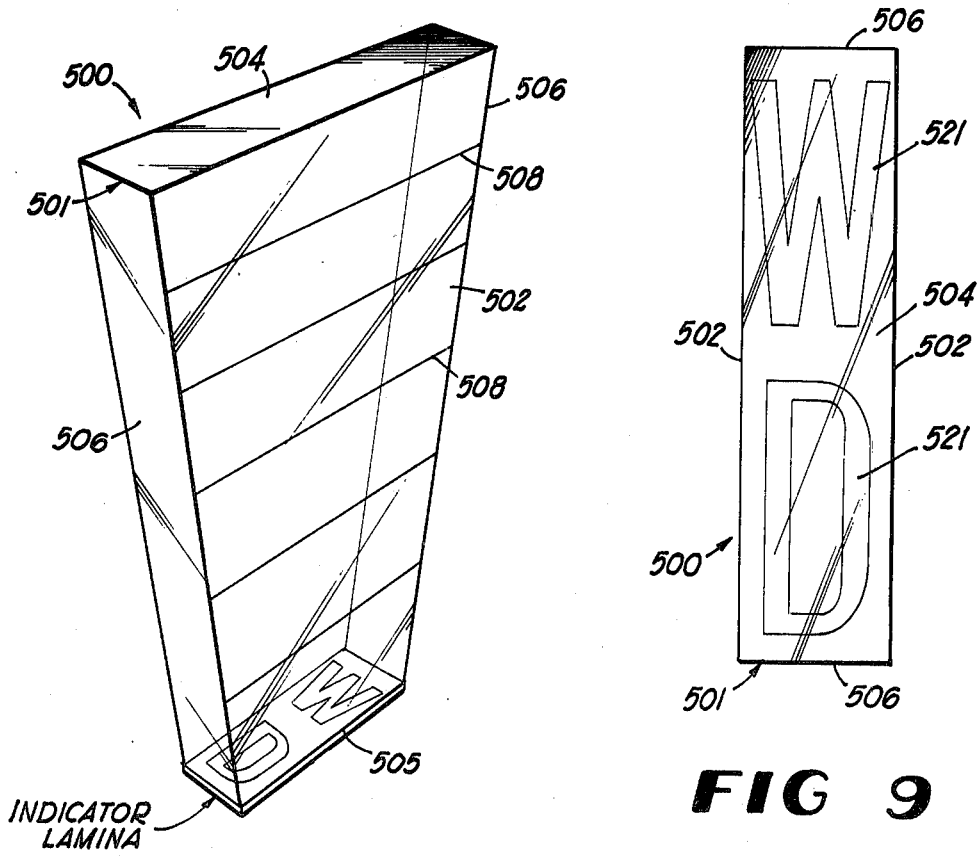
FIG 8
FIG 9

HUMIDITY SENSING DEVICE

CROSS-REFERENCE TO RELATED APPLICATIONS

This application is a continuation-in-part of my co-pending application Ser. No. 646,038, filed Jan. 2, 1976 now U.S. Pat. No. 4,034,609.

BACKGROUND OF THE INVENTION

This invention relates generally to sensing devices and more particularly to sensing devices which use inorganic chemical salt compositions that change color in response to changes in certain conditions such as humidity so that a visual representation of such humidity conditions are indicated.

A number of sensing devices have been proposed which utilize inorganic chemical salt compositions that change color in response to changes in certain conditions such as relative humidity. Examples of such devices which utilize inorganic chemical salt compositions to sense changes in relative humidity are illustrated in U.S. Pat. Nos. 2,249,867 and 3,680,364. These types of such prior art sensing devices have a common problem in that it is relatively difficult to visually perceive changes in the color of the inorganic chemical salt compositions in response to small changes in the relative humidity being sensed. Another problem associated in the manufacture of such prior art sensing devices is the difficulty in insuring that the inorganic chemical salt compositions are distributed uniformly throughout the visual area of the device to insure adequate representation of the changes in humidity. Yet another problem associated with such prior art devices is that, when the dispersed inorganic chemical salt compositions are exposed to water in liquid rather than vapor form, the moisture tended to leach the salt compositions out of the carrier material so that the device loses its humidity sensing capability.

SUMMARY OF THE INVENTION

These and other problems and disadvantages associated with the prior art humidity sensing devices with a visual display using inorganic chemical salt compositions that change color in response to changes in humidity are overcome by the invention disclosed herein by providing a humidity sensing device using inorganic chemical salt compositions with enhanced color change characteristics so that the changes in color of the inorganic chemical salt compositions in response to changes in humidity being sensed are easily visually perceived. This enhanced color change characteristic is accomplished by dispersing the inorganic chemical salt compositions in a transparent layer of carrier material to form an indicator layer so that light passing therethrough is filtered by the inorganic salt composition in the indicator layer. A light reflective layer is positioned on that side of the indicator layer opposite the person viewing same so that light passes through the indicator layer from the same side as the viewer and is then reflected back through the indicator layer to the viewer. Thus, the light is filtered twice before it reaches the viewer and the brightness of the color of the inorganic salt composition in the indicator layer is intensified over that associated with the prior art. The perceivability of the changes in color of the inorganic salt composition of the indicator layer may be further enhanced by the application of a flourescent material to the reflective backing layer. To prevent any water in liquid form from leaching the inorganic salt composition from the carrier material, a carrier material is used which will maintain the inorganic salt compositions dispersed therein while allowing the water vapor access to the salt compositions to affect color changes therein but which has a greater affinity to the inorganic salt compositions than water.

The apparatus of the invention includes generally a thin laminae with three basic layers, an indicator layer sandwiched between a transparent cover layer and a reflective backing layer. The indicator layer includes a transparent carrier material with an inorganic salt composition dispersed therein where the inorganic salt composition undergoes color changes in response to changes in relative humidity at the indicator layer so as to filter light passing through the layer. The inorganic salt composition is dispersed in the carrier material while the carrier material and inorganic salt composition are dissolved by compatible solvents and applied in this form by a casting or screening process to form the indicator layer upon evaporation of the solvent. The reflective backing layer is applied to the indicator layer on the side of the indicator layer opposite the cover layer so that light passing through the cover layer and the indicator layer is reflected back through the indicator layer and the cover layer to amplify the color of the inorganic salt compositions in the indicator layer. The transparent cover layer may have a mask applied thereto opposite the indicator layer to allow only selected portions of the indicator layer to be seen. A flourescent material may be applied to or incorporated in the reflective backing layer to further intensify the final color as perceived by the viewer.

These and other features and advantages of the invention will become more clearly understood upon consideration of the following detailed description and accompanying drawings wherein like characters of reference designate corresponding parts throughout the several views and in which:

BRIEF DESCRIPTION OF THE DRAWINGS

FIG. 6 is a perspective view showing a third application of the invention;

FIG. 7 is a greatly enlarged partial longitudinal cross-sectional view taken generally along line 7—7 in FIG. 6;

FIG. 8 is a perspective view showing a fourth application of the invention; and, FIG. 9 is a top end view of the application of FIG. 8.

These figures and the following detailed description disclose specific embodiments of the invention; however, it is to be understood that the inventive concept is not limited thereto since the inventive concept may be embodied in other forms.

DETAILED DESCRIPTION OF ILLUSTRATIVE EMBODIMENTS

Figure 1:
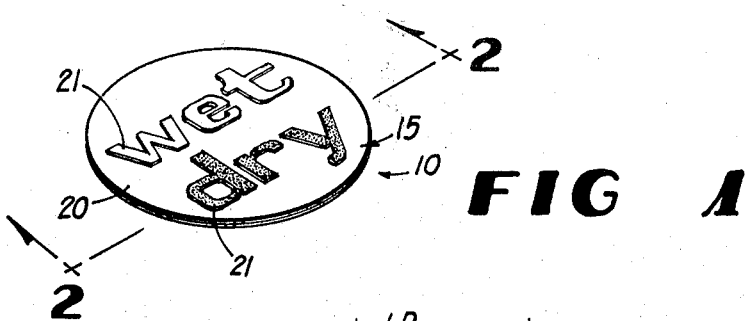
FIG. 1 is a perspective view of one application of the invention.
Figure 2:
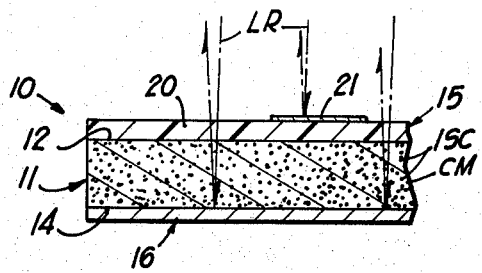
FIG. 2 is a partial, greatly enlarged cross-sectional view taken generally along line 2—2 in FIG. 1.

Referring to FIGS. 1 and 2, it will be seen that the sensing laminae 10 comprises generally a thin indicator layer 11 having a front viewing side 12 and a back side 14. A transparent cover layer 15 is applied to the front side 12 of layer 11 and a reflective layer 16 is applied to the back side 14 of layer 11. The sensing laminae 10 illustrated in FIG. 1 is a "wet/dry" indicator that indicates "wet" when the relative humidity of the substance to which the laminae 10 is exposed is above a certain preselected value and indicates "dry" when the relative humidity is below the certain preselected value. One use for such an indicator is in plant containers to indicate when the plant needs to be watered.

The indicator layer 11 includes a transparent carrier material CM shown in cross-section in FIG. 2 in which is dispersed or distributed an inorganic salt composition ISC illustrated by dots within the carrier material CM in FIG. 2. Illustrative and representative of such inorganic humidity sensing inorganic salt compositions, but not necessarily inclusive, are those taught by U.S. Pat. Nos. 2,460,065; 2,460,066; 2,460,067; 2,460,068; 2,460,069; 2,460,070; 2,460,071; 2,460,072; 2,460,073; 2,460,074; 2,580,737; and 2,627,505; and publications such as "Cobaltous Chlorides as a Water Vapor Indicator", A. J. Cameron, Chemistry and Industry, Mar. 13, 1965, page 461; "Color Changes Which Occur When Co Thiocyanate Impregnated Paper is Exposed to Air may be Used to Measure Humidity," Chemical Processing (London), November, 1960, page 29; "Estimation of Humidity with Cobalt Thiocyanate Paper and Permanent Color Standards," M. E. Solomon, Bulletin Entomological Research, 48 (1957), pages 489–506; and "Use of Cobalt Salts as Indicators for Humidity and Moisture," M. E. Solomon, Ann. Appl. Biology, 32 (1945), pages 75–78. These compositions, especially those using Cobalt Thiocyanate $[Co(CNS)_2]$ change their light transmission spectrum in response to changes in the relative humidity impressed on the composition and thus act as a strong color filter when light is allowed to pass through the composition. Each composition will have a first color below its transition relative humidity and will change to a second color above its transition relative humidity. Normally each composition will be substantially neutral gray in color at its transition relative humidity. From the foregoing, then, it will be seen that once the transition relative humidity at which the indicator layer 11 is to change color is preselected, one simply has to pick the appropriate inorganic salt composition to cause the color change to take place at the desired relative humidity.

The inorganic salt composition acts as a filter to absorb a certain portion of the light spectrum imposed thereon while transmitting the rest of the light spectrum therethrough. The light spectrum transmission characteristics of the inorganic salt compositions are controlled by the relative humidity to which the composition is exposed so that that portion of the light spectrum transmitted by the inorganic salt composition is different below the transition relative humidity from that transmitted above the transition relative humidity. Thus, the transmitted portion of the light transmission spectrum provides a visual indication of whether the relative humidity to which the inorganic salt composition is exposed is above or below the transition relative humidity. Usually, cobalt thiocynate compositions change their light spectrum transmission color from blue when the relative humidity to which they are exposed is above the transition relative humidity to light pink when the relative humidity to which they are exposed is below the transition relative humidity.

The carrier material is transparent so that it transmits substantially all of the light spectrum therethrough to prevent distortion of the color changes in the inorganic salt composition. Rather than gelatin as used in my earlier application Ser. No. 646,038, the carrier material is a plastic which can be dissolved in a solvent compatible with a solvent in which the inorganic salt composition can be dissolved. This allows a liquid mixture to be made using the dissolved plastic carrier material, its solvent, the dissolved inorganic composition, and its solvent. The indicator layer 11 is then appropriately formed such as by a casting process and the solvents allowed to evaporate leaving the solidified plastic carrier material with the inorganic salt composition uniformly distributed throughout the plastic carrier material. It will also be noted that the solidified plastic carrier material is moisture permeable for allowing the water vapor from the substance to which the indicator layer 11 is exposed to migrate to and from contact with the dispersed inorganic salt composition so that the relative humidity of the substance is indicated. The solidified plastic carrier material also has a greater affinity to the inorganic salt composition than the moisture penetrating the indicator layer 11 so that no leaching of the inorganic salt composition from the carrier material is encountered.

While a number of different plastics exhibit the above characteristics, it has been found that plastics in the cellulosic family work satisfactorily. Such plastics include cellulose acetate, cellulose acetate butyrate, and cellulose acetate propionate with cellulose acetate propionate providing excellent results. These cellulosic plastics are dissolved in an appropriate solvent such as acetone and certain alcohols so that they can be formed into thin films by various processes such as casting. These solvents can also be used to dissolve the crystalline inorganic salt compositions so that the dissolved carrier material can be readily mixed with the dissolved inorganic salt composition. Thus, it will be seen that the solvents used need not be the same but will work as long as they can be compatibly mixed. Acetone has provided excellent results as a solvent for both the cellulosic plastic carrier material and the inorganic salt composition.

Because the cellulosic plastic carrier material in the indicator layer 11 is sufficiently strong to be self-supporting, layer 11 may be used as the supporting layer of the laminae 10. The unit volume of the carrier material in the indicator layer 11 will determine the total amount of inorganic salt composition which can be carried in layer 11 since the greater the unit volume of carrier material, the more inorganic salt composition that can be carried. The unit volume of carrier material in layer 11 is dependent on the thickness of the carrier material in the layer. On the other hand, the response time required for the moisture to penetrate or permeate the indicator layer 11 is also directly related to the thickness of the carrier material in the layer so that the thicker the layer, the longer the response time. This requires a compromise in the thickness of the carrier material to insure that the carrier material is sufficiently thick to disperse enough of the inorganic salt composition so that the color thereof is easily visually perceived but is sufficiently thin to insure a reasonable response time. Another factor which must be considered is the range of thicknesses which are possible to achieve with the particular process used for forming the indicator layer 11. For instance a casting process may be limited to about 0.005-0.020 inch thick. The ultimate use of the indicator laminae 10 also acts as a constraint on the permissible time of response. For instance, the plant soil indicator laminae 10 may permit a relatively long response time of several hours. One thickness that has been successfully used for layer 11 in laminae 10 is about 0.008 inch. This thickness is sufficient to make the indicator layer 11 self-supporting.

Where indicator layer 11 is self-supporting, the cover layer 15 and reflective layer 16 need not be self-supporting and can be applied directly to layer 11 with a number of different processes such as silk screening, spray painting, or the like. That side of laminae 10 which is to be placed in contact with the substance whose relative humidity is to be detected must allow the moisture in the substance access to the indicator layer 11. Thus, either or both of the cover layer 15 and the reflective layer 16 may be moisture permeable. The laminae 10 is designed to lay on top of the soil in a plant container and sense the relative humidity at the soil surface. Thus, the cover layer 15 is moisture impermeable to isolate the indicator layer 11 from the surrounding atmosphere while the reflective layer 16 is moisture permeable to permit the moisture at the soil surface to gain access to the indicator layer 11.

While any number of transparent materials may be used for the cover layer 15, commercially available clear acrylic resin inks have performed satisfactorily. These inks are moisture impermeable and can be readily applied in thin layers of about 0.001 inch thick using silk screening techniques to the front viewing side of 12 of the indicator layer 11.

The reflective layer 16 is applied to the back side 14 of the indicator layer 11. The reflective layer 16 serves to reflect that portion of the incoming light spectrum transmitted through the cover layer 15 and indicator layer 11 back through the indicator layer 11 and out through the cover layer 15 so that it is visually perceived at the outside viewing surface 20 of the cover layer 15 as schematically represented by the light ray arrows LR in FIG. 2. Thus, it will be seen that the incoming light passing through indicator layer 11 is filtered by the inorganic salt composition in layer 11 whereupon this filtered light is then reflected back through the indicator layer 11 where the inorganic salt composition again filters the already filter reflected light to enhance the color exhibited by the inorganic salt composition in layer 11. The reflective layer 16 may be made of a number of different materials, however, it has been found that a commerically available vinyl-acetate dispersion applied to the back of the indicator layer 11 provides a satisfactory reflecting layer 16. The reflective layer 16 is porous or moisture permeable after curing to allow the moisture at the plant soil surface at the back side of layer 16 to be in intimate contact with the indicator layer 11. While a number of different thicknesses should carry out this function, a thickness range of about 0.0005 inch to 0.0020 inch for layer 16 has been found quite satisfactory. The color incorporated in the reflective backing layer 16 can be used to change the colors seen by the viewer as desired. For instance, a white color in the layer 16 causes the colors seen by the viewer to change from pink below transition to blue above transition; a yellow color in the backing layer 16 causes the colors to be seen to change from yellow-orange below transition to green above transition; and a red-orange color in the backing layer 16 causes the colors to be seen to change from red below transition to black above transition.

The intensity of the colors perceived by the viewer can be enhanced by the incorporation of a flourescent pigment in the reflective layer 16. For instance, the addition of an orange flourescent pigment added to a normally white reflective layer 16 causes the color seen by the vewwer to change from a bright orange-pink below transition to a bright blue above transition. Without the addition of this flourescent pigment, the blue component of the color in the inorganic salt compositions outweight the red component almost 10 to 1 and the color seen will vary from a very pale pink below transition to a relatively bright blue above transition. While a number of different color flourescent pigments may be added to the reflective backing layer 16, the orange flourescent pigment is generally preferred. It has been found that when an orange flourescent pigment commercially available as AX-1512 from Dayglo, Inc. is added to the white reflective layer so that the maximum red component of the color in the inorganic salt composition is about equal in intensity to the maximum blue component, excellent results are obtained. Where the perceived area of layer 11 is small, the flourescent pigment is usually used but is usually not necessary where the perceived area of layer 11 is relatively large.

Where it is only desirable to show two conditions as is the case with the "wet/dry" laminae 10, the construction is considerably simplified. One simply prints the indicating indicia 21 directly on the outside viewing surface 20 of the cover layer 16 with opaque inks so that the color of the indicator layer 11 serves as the visually perceived background. The color of the indicia 21 is selected which blends with the color of the layer 11 when the sensed relative humidity is opposite the condition indicated. For instance, the word "wet" is blue to match the color of layer 11 below its transition relative humidity while the word "dry" is light pink to match the color of the layer 11 above its transition relative humidity. Thus, when the sensed relative humidity is below the transition relative humidity, the word "wet" blends with the blue of layer 11 and is not readily visually perceptible but the word "dry", being a contrasting light pink, is readily visually perceptible. On the other hand, when the sensed relative humidity is above the transition relative humidity, the word "dry" blends with the light pink of layer 11 and is not readily visually perceptible but the word "wet", being a contrasting blue, is readily visually perceptible.

Both the cover layer 15 and the reflective layer 16 are self-adhering to the indicator layer 11 to form the basic laminae. The indicia 21 is then printed onto the outside viewing surface 20 of the cover layer 16. Usually the laminae 10 are fabricated in large sheets and then individually cut to size.

Figure 3:
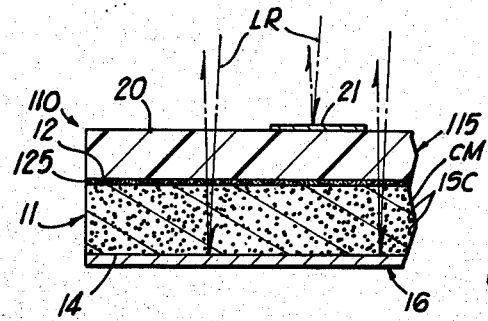
FIG. 3 is a view similar to FIG. 2 showing a second alternate construction of the invention.

FIG. 3 shows an alternate construction of the laminae and is designated 110. Laminae 110 uses the same indicator layer 11 and reflective layer 16. The viewing side 12 of the indicator layer 11 is adhesively attached to a flexible transparent cover layer 115 by a clear adhesive 125. The cover layer 115 is preformed, and the indicator layer 11 with reflective layer 16 are preformed. Then the adhesive 125 is used to attach the front viewing side 12 of the layer 11 to that side of the cover layer 115 opposite the outside surface 120 thereof. While any number of materials may be used for cover layer 115, clear ethylene polyterephthalate (Mylar) has been convienently employed. The Mylar cover layer 115 is moisture impermeable and thicknesses of about 0.001–0.020 inch may be used. The indicia 21 may be applied to the outside surface 120 of layer 115 similar to that of laminae 10. The operation of laminae 110 is the same as laminae 10.

Figure 4:
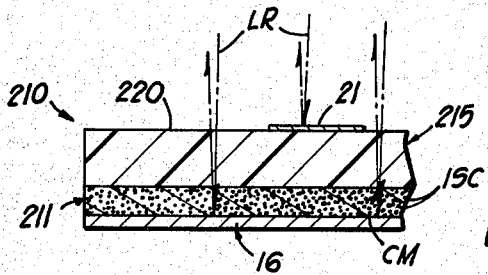
FIG. 4 is a view similar to FIG. 2 showing a third alternate construction of the invention.

FIG. 4 shows a third alternate construction for the laminae and is designated by the numeral 210. The indicator layer 211 is made with the inorganic salt composition dispersed in a carrier material having ink characteristics so that the layer 211 can be formed by a printing process such as silk screening. While a number of different carrier materials may be used, the carrier material must be capable of adhering to the cover layer 215 which serves to support the laminae 210. One such material for the cover support layer 215 conveniently available is ethylene polyterephthalate (Mylar). Clear inks especially adapted for printing on Mylar are commercially available for use as the carrier material for layer 211. Such inks have a plastic base compatible with Mylar and are dissolved in an appropriate solvent to provide the desired ink consistency. One such ink is commercially available in the United States under the designation NAZ-DAR MY-170. The inorganic salt composition is dissolved in an appropriate solvent compatible with the plastic base in the ink and its solvent. The dissolved inorganic salt composition is mixed with the ink while maintaining the proper ink consistency. This mixture is then applied to the cover support layer 215 with a conventional printing process such as silk screening. The subsequent evaporation of the solvents leaves the indicator layer 211. By applying layer 211 in this manner, the manufacturing cost is considerably reduced and the layer 211 can be made extremely thin (about 0.0005–0.001 inch) so that its response time is increased.

The reflective backing layer 16 is the same as that for laminae 10. The indicia 21 may be applied to the outside surface 220 of the cover support layer 215 similarly to laminae 10. The operation of laminae 210 is the same as laminae 10.

Figure 5:
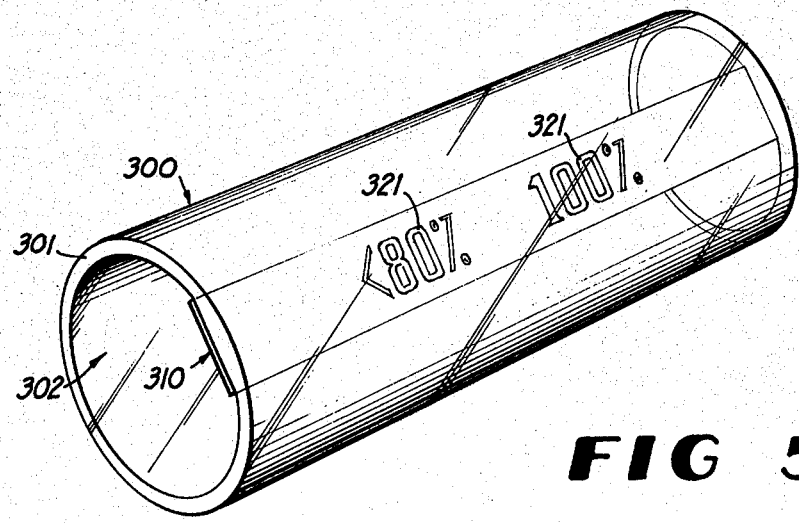
FIG. 5 is a perspective view showing a second application of the invention.

FIG. 5 illustrates a second application of the invention used as a detector 300 to indicate a relative humidity range in the output of various types of respiratory/inhalation therapy equipment (not shown). The detector 300 has a clear tubular side wall 301 which can be plugged into the output tubing (not shown) of the respiratory/inhalation therapy equipment so that the output flows through the passage 302 in side wall 301. A laminae strip 310 is attached to the inside of side wall 301 in passage 302. The strip 310 has at least an indicator layer similar to layers 11 or 211 and a reflective backing layer similar to layer 16 with the viewing side of the indicator layer facing the side wall 301 so that it is visible. The side wall itself may serve as the cover layer or a separate cover layer similar to layer 15, 115 or 215 may be used. The indicia 321 is usually between the indicator layer and the side wall 301. Since the respiratory/inhalation therapy equipment is usually operated in the neighborhood of 100% relative humidity, the indicia 321 illustrated is "100%" and "80%". When an inorganic salt composition in the indicator layer is selected so that it has a transition color change between 100% R.H. and 80% R.H., a single inorganic salt composition can be used. The color of indicia 321 is selected so that the appropriate indicia blends with the color of the indicator layer until the appropriate relative humidity is sensed in the output of the respiratory/inhalation therapy equipment by the indicator layer through the reflective backing layer to produce a color change in the indicator layer contrasting with the appropriate indicia.

FIGS. 6 and 7 illustrate the concept of the invention used in a wide range relative humidity sensing laminae 410 similar in appearance to the device of my application Ser. No. 646,038. The laminae 410 comprises generally an elongate transparent structural support cover layer 415 defining a front viewing surface 420 and a back surface 422, an indicator layer 411 on the back surface 422 of the structural support layer 415 with a front side 412 in juxtaposition with back surface 422 and a back side 414 on which a reflective backing layer 416 is attached. As will become more apparent, the laminae 410 is divided into a plurality of longitudinally separated indicator segments 430, individually referenced as segments $430_a$–$430_d$ in FIGS. 6 and 7 for purposes of differentiating between the segments.

The support layer 415 corresponds to the cover layer 215 in laminae 210, the indicator layer 411 corresponds generally to the layer 211 in laminae 210 except that it is divided into separate segments $411_a$–$411_d$ as will become more apparent, and the reflective backing layer 416 corresponds to layer 16 in laminae 210 except that it may likewise be divided into segments $416_a$–$416_d$.

Each segment $430_a$–$430_d$ indicates a different relative humidity and thus has a different transition relative humidity. While this transition relative humidity for each segment may be changed as desired of the number of segments changed, the illustrated transition relative humidity for segment $430_a$ is 60% R.H., for segment $430_b$ is 70% R.H., and so on to segment $430_d$ which is 100% R.H. Thus, it will be seen that while the carrier material in the indicator segments $411_a$–$411_d$ is the same, the particular inorganic salt composition of each individual indicator segment $411_a$–$411_d$ is varied. Normally, the carrier material and particular inorganic salt compositions are individually mixed in liquid form prior to application to the support layer 415 with each indicator segment $411_a$–$411_d$ individually applied to support layer 415 using techniques similar to those of indicator layer 211 for laminae 210.

The reflective layer 416 is applied similarly to layer 16 in laminae 210. Because the segments in indicator layer 411 are usually separated, the layer 416 may be applied in segments $416_a$–$416_d$.

Unlike laminae 210, the laminae 410 uses the indicator layer 411 to change the color of the indicia 421 rather than change the background color for the indicia. Thus, the indicia 421 are appropriate openings in an opaque mask 431, usually of a dark color such as black. It will also be appreciated that, while the indicator segments $411_a$–$411_d$ will have one color above their transition relative humidity and another color below their transition relative humidity, they usually have a still different color at their transition relative humidity. For instance, when the blue-light pink color scheme is used as already described, the segments $411_a$–$411_d$ will normally have a gray color at their transition relative humidity. When a flourescent pigment is used as already described in this color scheme, the transition color is an easily perceived slate gray. Thus, one simply looks for the gray to see what the actual relative humidity is.

FIGS. 8 and 9 illustrate another application of the invention incorporated in a "wet/dry" soil indicator 500 for plants. The indicator 500 includes a transparent prismatic member 501 generally trapezoidal in shape with opposed, generally parallel side surfaces 502; opposed, generally parallel top and bottom surfaces 504 and 505 normal to side surfaces 502; and opposed angled edge surfaces 506 which taper toward each other from top surface 504 to bottom surface 505. The member 501 is internally reflecting so that when one looks through the top surface 504, the bottom surface 505 is seen as axially elongated to fill top surface 504 as seen in FIG. 9 even though bottom surface 505 is shorter than top surface 504. The top surface 504 is the viewing surface and bottom surface 505 is the sensing surface. One of the laminae 10, 110 or 210 may be appropriately attached to the bottom surface 505 with its outside viewing surface facing bottom surface 505. The cover layer 15, 115 or 215 may be eliminated for this application. The "wet/dry" indicia 521 may be shortened to "S/D" as illustrated in FIG. 9.

In operation, the member 501 is pushed into soil, bottom surface first, until the desired level is reached at which the soil relative humidity is to be sensed. Appropriate marks 508 may be provided on one of the side surfaces 502 to facilitate this operation. This places the sensing laminae at the appropriate level in the soil while being visible through top surface 504 so the humidity condition can be visually perceived.

I claim:

1. A relative humidity sensing device for visually indicating changes in relative humidity in a substance to which it is exposed comprising:

an indicator layer having a front viewing side and a back side, said indicator layer comprising a transparent plastic carrier material which transmits therethrough substantially the complete light spectrum incident thereon; and an inorganic salt composition dispersed in and carried by said carrier material, said inorganic salt composition having a light transmission spectrum which changes in response to changes in relative humidity so that the transmitted light spectrum provides a known visible response to changes in relative humidity, said plastic carrier material allowing moisture to enter and leave said indicator layer to expose said inorganic salt composition to the moisture generating the relative humidity in the substance and said carrier material having a greater affinity for said inorganic salt composition than the moisture to prevent the moisture from leaching said inorganic salt composition from said carrier material, said indicator layer internally reflecting substantially no visually perceivable spectrum of the light incident thereon.

2. The relative humidity sensing device of claim 1 wherein said carrier material is selected from a group consisting of cellulose acetate, cellulose acetate butyrate, and cellulose acetate propionate.

3. The relative humidity sensing device of claim 1 wherein said carrier material is a clear ink.

4. The relative humidity sensing device of claim 1 further including a reflective layer on the back side of said indicator layer so that the light spectrum transmitted through said indicator layer toward said reflective layer is reflected back through said indicator layer so that the transmitted light spectrum is visible from the front viewing side of said indicator layer.

5. The relative humidity sensing device of claim 4 further including a transparent cover layer over the front viewing side of said indicator layer.

6. The relative humidity sensing device of claim 5 wherein said transparent cover layer is moisture impermeable and said reflective backing layer is moisture permeable.

7. The relative humidity sensing device of claim 6 wherein said inorganic salt composition transmits a first portion of the light spectrum therethrough to said reflective layer and retransmits the reflected first portion of the light spectrum back out of said indicator layer through the front viewing side thereof to be visually perceived as a first color when the substance relative humidity is in a first range and transmits a second portion of the light spectrum therethrough to said reflective layer and retransmits the reflected second portion of the light spectrum back out of said indicator layer through the front viewing side thereof to be visually perceived as a second color when the substance relative humidity is in a second range different from the first range; and further including first indicator indicia operatively associated with a portion of the front viewing side of said indicator layer and having a color substantially visually the same as the first color of said indicator layer, and a second indicator indicia operatively associated with a different portion of the front viewing side of said indicator layer and having a color substantially visually the same as the second color of said indicator layer so that said first indicator indicia provides a contrasting color to that of said inorganic salt composition when said inorganic salt composition exhibits the visually perceptive second color and said second indicator indicia providing a contrasting color to the color of said inorganic salt composition when it is exhibiting the visually perceptive first color to assist a person in visually perceiving the relative humidity range being indicated by said indicator layer.

8. The relative humidity sensing device of claim 4 wherein said inorganic salt composition transmits a first portion of the light spectrum therethrough to said reflective layer and retransmits the reflected first portion of the light spectrum back out of said indicator layer through the front viewing side thereof to be visually perceived as a first color when the substance relative humidity is in a first range and transmits a second portion of the light spectrum therethrough to said reflective layer and retransmits the reflected second portion of the light spectrum back out of said indicator layer through the front viewing side thereof to be visually perceived as a second color when the substance relative humidity is in a second range different from the first range; and further including first indicator indicia operatively associated with a portion of the front viewing side of said indicator layer and having a color substantially visually the same as the first color of said indicator layer, and a second indicator indicia operatively associated with a different portion of the front viewing side of the indicator layer and having a color substantially visually the same as the second color of said indicator layer so that said first indicator indicia provides a contrasting color to that of said inorganic salt composition when said inorganic salt composition exhibits the visually perceptive second color and said second indicator indicia providing a contrasting color to the color of said inorganic salt composition when it is exhibiting the visually perceptive first color to assist a person in visually perceiving the relative humidity range being indicated by said indicator layer.

9. The relative humidity sensing device of claim 1 further including indicator indicia operatively associated with the front viewing side of said indicator layer to assist a person in visually perceiving the change in the light transmission spectrum of said indicator layer.

10. The relative humidity sensing device of claim 9 wherein said indicator indicia has a color substantially visually the same as one of the colors within the light transmission spectrum of said inorganic salt composition so that said indicator indicia provides a contrasting color to that of said inorganic salt composition when said inorganic salt composition exhibits a visually perceptive color other than the color of said indicator indicia and so that said indicator indicia is substantially visually imperceptive when said inorganic salt composition exhibits the visually perceptive color matching that of said indicator indicia.

11. The relative humidity sensing device of claim 10 wherein the color of said indicator indicia is selected to match the color within the light transmission spectrum exhibited by said inorganic salt composition when said inorganic salt composition is exposed to a high humidity condition.

12. A relative humidity sensing device for visually indicating changes in relative humidity in a substance to which it is exposed comprising:
an indicator layer having a front viewing side and including an inorganic salt composition which exhibits a visually perceptive first color at the front viewing side thereof when the substance relative humidity is in a first relative humidity range and which exhibits a visually perceptive second color at the front viewing side thereof when the substance relative humidity is in a second relative humidity range different from the first relative humidity range;
first indicator indicia operatively associated with a portion of the front viewing side of said indicator layer and having a color substantially visually the same as the first color of said indicator layer; and,
a second indicator indicia operatively associated with a different portion of the front viewing side of the indicator layer and having a color substantially visually the same as the second color of said indicator layer so that said first indicator indicia provides a contrasting color to that of said indicator layer when said indicator layer exhibits the visually perceptive second color and said second indicator indicia providing a contrasting color to the color of said indicator layer when it is exhibiting the visually perceptive first color to assist a person in visually perceiving the relative humidity range being indicated by said indicator layer.

13. A relative humidity sensing device for visually indicating changes in relative humidity in a substance to which it is exposed comprising:
an indicator layer having a front viewing side and a back side, said indicator layer comprising a transparent plastic carrier material which transmits therethrough substantially the complete light spectrum incident thereon; and an inorganic salt composition dispersed in and carried by said carrier material, said inorganic salt composition having a light transmission spectrum which changes in response to changes in relative humidity so that the transmitted light spectrum provides a known visible response to changes in relative humidity, said plastic carrier material allowing moisture to enter and leave said indicator layer to expose said inorganic salt composition to the moisture generating the relative humidity in the substance and said carrier material having a greater affinity for said inorganic salt composition than the moisture to prevent the moisture from leaching said inorganic salt composition from said carrier material.

* * * * *